US008631891B2

(12) United States Patent
Wilmanowicz et al.

(10) Patent No.: US 8,631,891 B2
(45) Date of Patent: Jan. 21, 2014

(54) METHOD AND APPARATUS FOR CONTROLLING A HYBRID POWERTRAIN SYSTEM

(75) Inventors: Marek L. Wilmanowicz, Pinckney, MI (US); Matthew Leonard Kaufer, Holly, MI (US); Mark J. Potter, Davisburg, MI (US); Anthony H. Heap, Ann Arbor, MI (US); William R. Cawthorne, Milford, MI (US); Michael J. Bolton, Battle Creek, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/548,274

(22) Filed: Jul. 13, 2012

(65) Prior Publication Data

US 2012/0283921 A1 Nov. 8, 2012

Related U.S. Application Data

(63) Continuation-in-part of application No. 12/243,032, filed on Oct. 1, 2008, now Pat. No. 8,271,173.

(60) Provisional application No. 60/986,073, filed on Nov. 7, 2007.

(51) Int. Cl.
*B60K 15/00* (2006.01)
*G06F 7/00* (2006.01)

(52) U.S. Cl.
USPC .............. 180/69.3; 701/70; 701/54; 180/65.1

(58) Field of Classification Search
USPC ............ 701/11, 29, 30, 54; 180/65.1, 65.265, 180/65.27, 65.285, 65.31; 477/3, 5
See application file for complete search history.

(56) References Cited

U.S. PATENT DOCUMENTS

| | | | |
|---|---|---|---|
| 6,213,911 B1 * | 4/2001 | Salecker et al. | ................ 477/97 |
| 6,752,741 B2 | 6/2004 | Kahlon et al. | |
| 6,832,148 B1 | 12/2004 | Bennett | |
| 6,868,318 B1 | 3/2005 | Cawthorne | |
| 7,154,236 B1 | 12/2006 | Heap | |
| 7,236,871 B2 * | 6/2007 | Sah et al. | ........................ 701/70 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |

(Continued)

FOREIGN PATENT DOCUMENTS

GB 2368406 1/2002

*Primary Examiner* — John Walters
*Assistant Examiner* — James Triggs

(57) ABSTRACT

A vehicular powertrain system includes an engine, an electro-mechanical transmission and an electric machine arranged in an input-split hybrid configuration. A control system for the powertrain system includes a control module signally connected to a plurality of input devices and configured to execute program code stored on a computer readable medium to control the powertrain. The program code monitors operator inputs, determines an intent to service the vehicle based upon the operator inputs, commands the electric machine to generate a net torque output of zero, and controls the engine speed correlative to an operator depression of an accelerator pedal.

3 Claims, 2 Drawing Sheets

(56) References Cited

U.S. PATENT DOCUMENTS

| | | |
|---|---|---|
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz et al. |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |

(56) References Cited

U.S. PATENT DOCUMENTS

| | | |
|---|---|---|
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

\* cited by examiner

METHOD AND APPARATUS FOR CONTROLLING A HYBRID POWERTRAIN SYSTEM

CROSS REFERENCE TO RELATED APPLICATIONS

This application is a divisional of U.S. application Ser. No. 12/243,032, filed on Oct. 1, 2008, which claims the benefit of U.S. Provisional Application No. 60/986,073 filed on Nov. 7, 2007, both of which are hereby incorporated herein by reference.

TECHNICAL FIELD

This disclosure pertains generally to control systems for powertrain systems utilizing electro-mechanical transmissions.

BACKGROUND

The statements in this section merely provide background information related to the present disclosure. Accordingly, such statements are not intended to constitute an admission of prior art.

Known powertrain architectures include torque-generative devices, including internal combustion engines and electric machines, which transmit torque through a transmission device to an output. The output is operatively connected to a driveline for a motor vehicle. One exemplary powertrain includes a two-mode, compound-split, electro-mechanical transmission which utilizes an input member for receiving motive torque from a prime mover power source, preferably an internal combustion engine, and an output member for delivering motive torque from the transmission to the vehicle driveline. Electric machines, operable as motors or generators, generate a torque input to the transmission, independently of a torque input from the internal combustion engine. The electric machines may transform vehicle kinetic energy, transmitted through the vehicle driveline, to electrical energy potential that is storable in an electrical energy storage device. A control system monitors various inputs from the vehicle and the operator and provides operational control of the powertrain system, including controlling transmission operating state and gear shifting, controlling the torque-generative devices, and regulating the electrical power interchange between the electrical energy storage device and the electric machines. A control system monitors various inputs from the vehicle and the operator and provides operational control of the powertrain system, including controlling transmission operating state and gear shifting, controlling the torque-generative devices, and regulating the electrical power interchange between the electrical energy storage device and the electric machines. Known system torques that can vary during powertrain operation include hydraulic pumps supplying pressurized hydraulic fluid to actuate various clutch devices in the transmission and provide system cooling. Known transmission gears and other rotating components generate momentums and inertias which affect torque output. Known electrically-powered accessories generate varying electrical loading which affect operation.

Known control systems monitor various inputs from the vehicle and the operator and provide operational control of the powertrain system, including controlling transmission operating state and gear shifting, controlling the torque-generative devices, and regulating the electrical power interchange between the electrical energy storage device and the electric machines. Known control systems for hybrid powertrains interactively control the internal combustion engine and the electric machines to transmit mechanical torque and electric power to meet an operator torque request for tractive torque. Such systems act to simultaneously optimize vehicle fuel economy, minimize vehicle exhaust emissions, and meet design life goals for an electric energy storage device, e.g., a high voltage battery pack, and take into consideration other requirements related to driveability, system robustness, and accessory loading. The systems operate by accurately measuring vehicle load demands, determining the capability of the energy storage devices, determining desired propulsion system operating conditions for optimal fuel economy, and implementing the desired propulsion system operating conditions.

A powertrain may have a need for service, including diagnostic analysis related to vehicle operation and engine operation. Operation of the engine independently of the hybrid powertrain is useful during diagnostic analysis in order to identify and isolate a fault and verify any subsequent repair.

SUMMARY

A vehicular powertrain system includes an engine, an electro-mechanical transmission and an electric machine arranged in an input-split hybrid configuration. A control system for the powertrain system includes a control module signally connected to a plurality of input devices and configured to execute program code stored on a computer readable medium to control the powertrain. The program code monitors operator inputs, determines an intent to service the vehicle based upon the operator inputs, commands the electric machine to generate a net torque output of zero, and controls the engine speed correlative to an operator depression of an accelerator pedal.

BRIEF DESCRIPTION OF THE DRAWINGS

One or more embodiments will now be described, by way of example, with reference to the accompanying drawings, in which.

DETAILED DESCRIPTION

Figure 1:
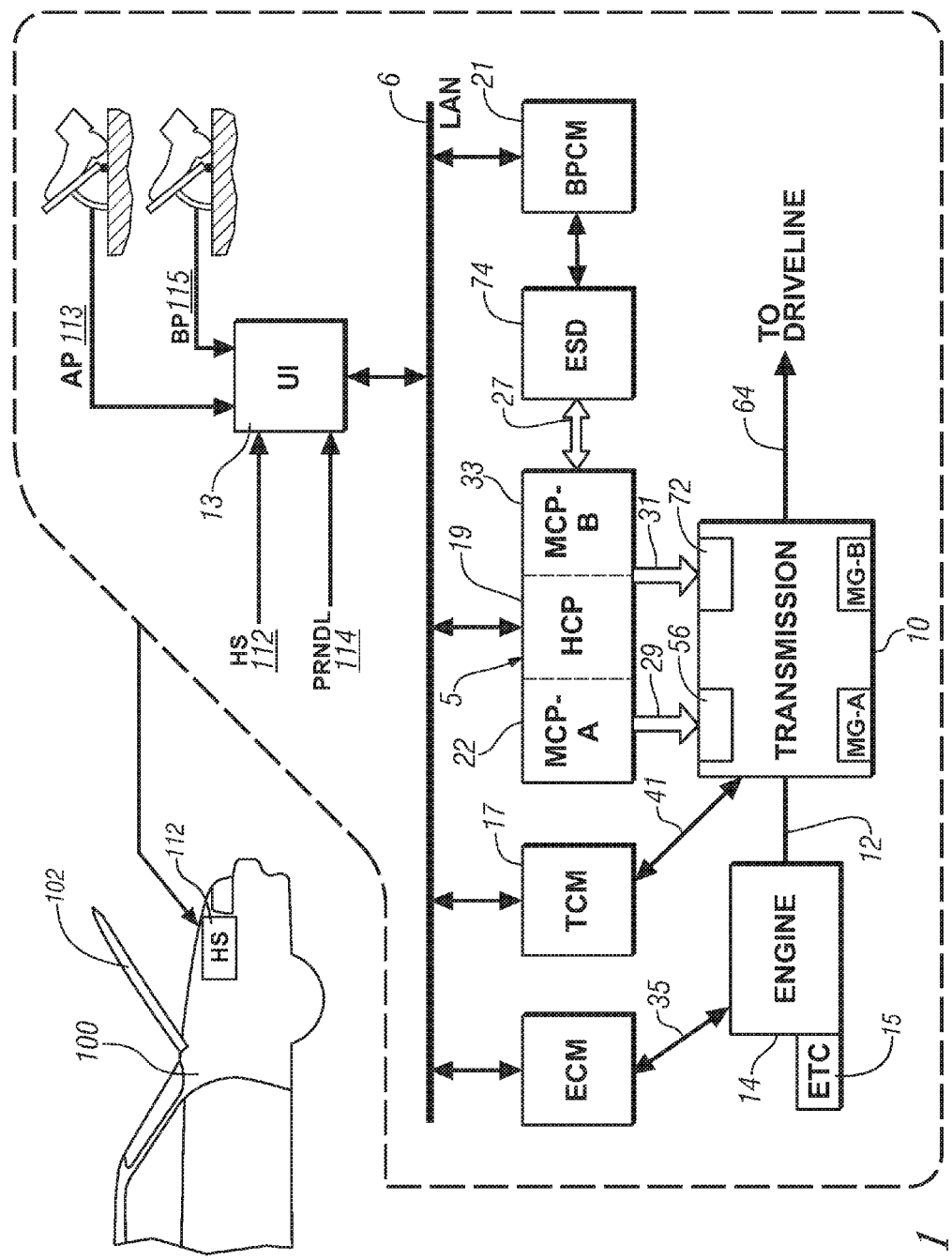
FIG. 1 is a schematic diagram of an exemplary vehicle and powertrain.

Referring now to the drawings, wherein the showings are for the purpose of illustrating certain exemplary embodiments only and not for the purpose of limiting the same, FIG. 1 schematically depicts a vehicle 100 including a powertrain and control system comprising an engine 14, two-mode, compound-split electro-mechanical transmission 10 including first and second electric machines ('MG-A') 56 and ('MG-B') 72, and a plurality of control modules, which has been configured to execute the control scheme described and depicted herein. The vehicle 100 includes a hood 102 by which the hybrid powertrain can be accessed when opened. Opening and closing of the hood 102 is monitored by a hood switch 112 ('HS').

The exemplary engine 14 comprises a multi-cylinder internal combustion engine selectively operative in several states to transmit input torque to the transmission 10 via an input shaft 12, and can be either a spark-ignition or a compression-ignition engine. The engine 14 has a crankshaft (not shown) which is operatively connected to the input shaft 12. The crankshaft is monitored by a sensing device adapted to monitor rotational position and speed ('NE'). Output of the engine is characterized in terms of the rotational speed and an engine output torque ('TE'). The exemplary engine includes a device to control flow rate of intake air to the engine 14, depicted in this embodiment as an electronically controlled throttle device ('ETC') 15, which correspondingly controls rotational speed of the engine 14 when the engine 14 comprises a spark-ignition engine. Operation of the engine, including the electronically controlled throttle device 15, is controlled by an engine control module (hereafter 'ECM') 23. Other devices can be utilized to effectively control engine intake air. Rotational speed of the engine 14 can be controlled by other control mechanisms (not shown) including, e.g., control of fuel injection timing and mass when the engine 14 comprises a compression-ignition engine.

The transmission 10 preferably includes one or more planetary-gear sets (not shown) and one or more selectively applicable torque-transmitting clutches (not shown), the input shaft 12, and an output shaft 64. The transmission 10 is selectively operative in one of a plurality of gear/mode operating states, comprising one or more fixed gear operating states and one or more continuously variable mode operating states, by selective actuation of the torque-transmitting clutches. Each of the first and second electric machines 56 and 72 is preferably operatively connected to the transmission via one of the planetary gear sets. The first and second electric machines 56 and 72 comprise three-phase AC electric machines operative as motor/generator devices, and each includes a stator (not shown) and a rotor (not shown). The motor stator for each machine is grounded to an outer transmission case (not shown), and the motor rotor connects to one or more of the planetary gear sets and/or the output shaft 64. The transmission is controlled in one of the gear/mode operating states by a transmission control module (hereafter 'TCM') 17. The first and second electric machines 56 and 72 are controlled by first and second motor control modules ('MCP-A') 22 and ('MCP-B') 33, described hereinbelow. Operation of the first and second electric machines 56 and 72 is monitored using sensing systems comprising resolvers (not shown) which provide rotational speeds, referred to as NA and NB respectively. The output shaft 64 is operably connected to a vehicle driveline (not shown) to provide an output torque ('TO') to vehicle wheels (not shown). There is a transmission output speed sensor (not shown) adapted to monitor rotational speed and rotational direction of the output shaft 64.

An electrical energy storage device (hereafter 'ESD') 74 comprises a high-voltage device adapted to store electric energy, and can comprise a battery system, an ultracapacitor system, or other device. The ESD 74 is high voltage DC-coupled to the first and second motor control modules 22 and 33 via DC transfer conductors 27. The first motor control module 22 transmits electrical power to and from the first electric machine 56 by transfer conductors 29, and the second motor control module 33 similarly transmits electrical power to and from the second electric machine 72 by transfer conductors 31. Electrical power is transmitted to and from the ESD 74 in accordance with whether the ESD 74 is being charged or discharged. The first and second motor control modules 22 and 33 comprise power inverters (not shown) and respective motor control modules configured to receive motor control commands and control inverter states therefrom for providing motor drive or regeneration functionality. The power inverters of the first and second motor control modules 22 and 33 comprise known complementary three-phase power electronics devices, and each includes controlled insulated gate bipolar transistors ('IGBT') (not shown) for converting DC power from the ESD 74 to AC power for powering one of the first and second electric machines 56 and 72, by switching at high frequencies. There is one pair of IGBTs for each phase of each of the three-phase first and second electric machines 56 and 72.

The transmission 10 receives input torque from torque-generative devices including the engine 14, and the first and second electric machines 56 and 72 as a result of energy conversion from fuel or electrical potential stored in the ESD 74. The transmission 10 transmits the input torque from the engine 14 and the first and second electric machines 56 and 72 to the output, e.g., the driveline, via the planetary gears through selective application of the torque transfer clutches.

The control system for the powertrain system comprises an architecture consisting of distributed control modules. The elements described hereinafter comprise a subset of a control module architecture for overall control of the vehicle 100, and provide coordinated system control of the powertrain system described herein. The control system synthesizes pertinent information and inputs, and executes algorithms to control various actuators to achieve control targets, including such parameters as fuel economy, emissions, performance, driveability, and protection of hardware, including batteries contained within the ESD 74 and the first and second electric machines 56 and 72. The distributed control module architecture includes ECM 23, TCM 17, a battery pack control module (hereafter 'PCM') 21, and a transmission power inverter module (hereafter 'TPIM') 19, which includes a hybrid control module (hereafter 'HCP') 5 and the first and second motor control modules 22 and 33 in the embodiment described. This control module configuration includes a full-duplex synchronous serial data link (not shown) thus permitting direct communication between the HCP 5 and the first and second motor control modules 22 and 33 for high-speed communications without communications delays. Furthermore, data and messages are communicated between the HCP 5 and first and second motor control modules 22 and 33 over a local area network (hereafter 'LAN') bus 6.

The HCP 5 provides supervisory control and coordination of the ECM 23, TCM 17, TPIM 19, and BPCM 21. A user interface ('UI') 13 is operatively connected to a plurality of devices through which a vehicle operator controls and directs operation of the powertrain. Based upon inputs from the user interface 13 and the powertrain including the ESD 74, the HCP 5 generates commands to control operation of the hybrid powertrain, including: an operator torque request ('TO_REQ'), a commanded output torque to driveline 90, the engine input torque, clutch torques for the various transmission clutches; and motor torque commands ('TA' and 'TB' respectively) for first and second motor control modules 22 and 33 to control first and second electric machines 56 and 72, respectively.

The ECM 23 is directly connected to the engine 14, and functions to acquire data from a variety of sensors and control a variety of actuators of the engine 14 over a plurality of discrete lines collectively shown as aggregate line 35. For simplicity, the ECM 23 is shown bi-directionally interfacing with engine 14 via the aggregate line 35. Engine parameters monitored by the ECM 23 include engine coolant temperature, the engine input speed to the input shaft 12, intake manifold pressure, ambient air temperature, ambient pressure, and states of engine actuators. Various actuators that may be controlled by the ECM 23, while not separately shown, include fuel injectors, ignition modules, the electronically controlled throttle device 15, EGR valves, turbocharger devices, and others. The ECM 23 receives the engine input torque from the HCP 5, and generates a desired axle torque, and an indication of actual engine input torque to the transmission 10, which is communicated to the HCP 5. The HCP 5 can command a positive engine input torque, a negative engine input torque, or zero engine input torque including a command to shut the engine off during operation of the vehicle 100.

The TCM 17 is operably connected to the transmission 10 and functions to acquire data from a variety of sensors and provide command signals to the transmission 10 over a plurality of discrete lines collectively shown as aggregate line 41. Inputs from the TCM 17 to the HCP 5 include estimated clutch torques for each clutch and a rotational output speed of the output shaft 64 from a transmission output sensor (not shown). Other actuators and sensors may be used to provide additional information from the TCM 17 to the HCP 5 for control purposes. The TCM 17 monitors inputs from pressure switches and selectively actuates pressure control solenoids and shift solenoids to actuate the clutches (not shown) to achieve various transmission operating states.

The BPCM 21 is signally connected one or more sensors (not shown) operable to monitor electrical current and voltage parameters of the ESD 74 to provide information about states of the ESD 74 to the HCP 5. Such information includes ESD state-of-charge, electrical current flow between the ESD 74 and TPIM 19 in terms of amp-hour throughput, ESD 74 voltage, and minimum and maximum available electrical power from the ESD 74, referred to herein as $P_{BAT\_MIN}$ and $P_{BAT\_MAX}$.

The user interface 13 is signally connected to a plurality of devices through which a vehicle operator controls and directs operation of the powertrain, including the transmission 10. The devices include an accelerator pedal ('AP') 113, an operator brake pedal ('BP') 115, transmission gear selector ('PRNDL') 114, hood switch 112, and, a vehicle speed cruise control (not shown). The accelerator pedal 113 preferably comprises foot pedal device depressible by the vehicle operator. The accelerator pedal 113 generates a signal output that varies linearly based upon operator depression of the pedal. When there is no depression of the accelerator pedal 113, the signal output is readable as 0%, and when the accelerator pedal 113 is fully depressed, the signal output is readable as 100%. The HCP 5 determines the operator torque request based upon the input from the accelerator pedal 113. The brake pedal 115 preferably comprises a foot pedal device depressible by the vehicle operator. The brake pedal 115 generates a signal output that varies based upon magnitude of operator force in depressing the pedal. When there is no depression of the brake pedal 115, the signal output is readable as 0%, and when the brake pedal 115 is fully depressed, the signal output is readable as 100%. The HCP 5 determines a braking command and an electrical regeneration command based upon the input from brake pedal 115. The transmission gear selector 114 preferably comprises a known device having a discrete number of operator-selectable positions. The transmission gear selector 114 generates a signal correlative to each of operator-selectable positions, comprising PARK ('P'), REVERSE ('R'), NEUTRAL ('N'), DRIVE ('D'), and, LOW ('L'), based upon position. The hood switch 112 preferably comprises a known device comprising any one of a plurality of electro-mechanical or solid state devices operative to generate a first discrete signal output indicating the hood 102 is closed and a second discrete output indicating the hood 102 is open. When the hood switch 112 indicates that the hood 102 is opened, a control scheme in the HCP 5 adapts operation of the powertrain control system to modify operation of the powertrain, as is described herein with reference to FIG. 2.

The aforementioned control modules communicate with other control modules, sensors, and actuators via the LAN bus 6. The LAN bus 6 allows for structured communication of control parameters and commands between the various control modules. The specific communication protocol utilized is application-specific. The LAN bus 6 and appropriate protocols provide for robust messaging and multi-control module interfacing between the aforementioned control modules, and other control modules providing functionality such as antilock brakes, traction control, and vehicle stability. Multiple communications buses may be used to improve communications speed and provide some level of signal redundancy and integrity.

Each of the control modules ECM 23, TCM 17, TPIM 19 and BPCM 21 is preferably a general-purpose digital computer comprising a microprocessor or central processing unit, storage mediums comprising read only memory, electrically programmable read only memory, random access memory, a high speed clock, analog to digital and digital to analog circuitry, and input/output circuitry and devices and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN bus 6.

Algorithms for control and state estimation in each of the control modules are executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the user interface 13, the HCP 5 and one or more of the other control modules determine the commanded torque output to be effected at the output shaft 64 to meet the operator torque request. Final vehicle acceleration is affected by other factors, including, e.g., road load, road grade, and vehicle mass. The transmission 10 is controlled to a preferred one of the gear/mode operating states based upon a variety of operating characteristics of the powertrain. This includes the operator torque request, communicated through the inputs to the user interface 13 as previously described. The preferred operating state may be predicated on a powertrain torque demand caused by a control module command to operate the electric machines in an electrical power generating mode or in a torque generating mode.

The preferred operating state can be determined by an optimization algorithm or routine operable to determine optimum system efficiency based upon the operator torque request, the state-of-charge of the ESD 74, and energy efficiencies of the engine 14 and the first and second electric machines 56 and 72. During normal operation, the HCP 5 manages the torque output by monitoring and managing input torques from the engine 14 and the first and second electric machines 56 and 72. The HCP 5 uses the operator torque request to calculate an optimum input torque to the transmission 10, including a preferred transmission gear/mode operating state and a preferred engine input speed to the transmission 10. The HCP 5 determines a constrained operating space for operating the engine 14, transmission 10, and the first and second electric machines 56 and 72 based upon the optimum input torque and torque output potential of the first and second electric machines 56 and 72, the minimum and maximum available electrical power from the ESD 74, the state-of-charge of the ESD 74, and related system equations. This includes the HCP 5 identifying available transmission gear/mode operating states and a region comprising engine and motor torques usable to achieve the commanded output torque at the output shaft 64 based upon the operator inputs determined from the user interface 13. Cost functions are used to determine the preferred gear/mode operating state and engine input speed to the transmission within the operating state and the usable engine and motor torque region. The HCP 5 commands the ECM 23 to control the engine 14 and commands first and second motor control modules 22 and 33 to control the first and second electric machines 56 and 72 to provide outputs to meet the operator torque request. The HCP 5 arbitrates the commanded engine torque and motor torque commands against torque interventions, including transmission shift torque management and engine start/stop torque control. Final arbitrated torque commands for the engine 14 and the first and second electric machines 56 and 72 are output, limited by the system constraints of power and torque. The control system manages the torque inputs from the engine 14 and the first and second electric machines 56 and 72 to the transmission 10 based upon an outcome of the executed optimization routine, with the system efficiencies optimized to improve fuel economy and manage battery charging. Furthermore, system operation can be controlled based upon a fault in a component or system. The HCP 5 monitors the parametric states of the torque-generative devices and determines the output of the transmission 10 required to arrive at the output torque to meet the operator torque request. Thus during ongoing operation of the powertrain, the HCP 5 controls operation of the engine 14, the first and second electric machines 56 and 72, and the transmission 10 to generate output which meets the operator inputs as determined through the user interface 13.

Figure 2:
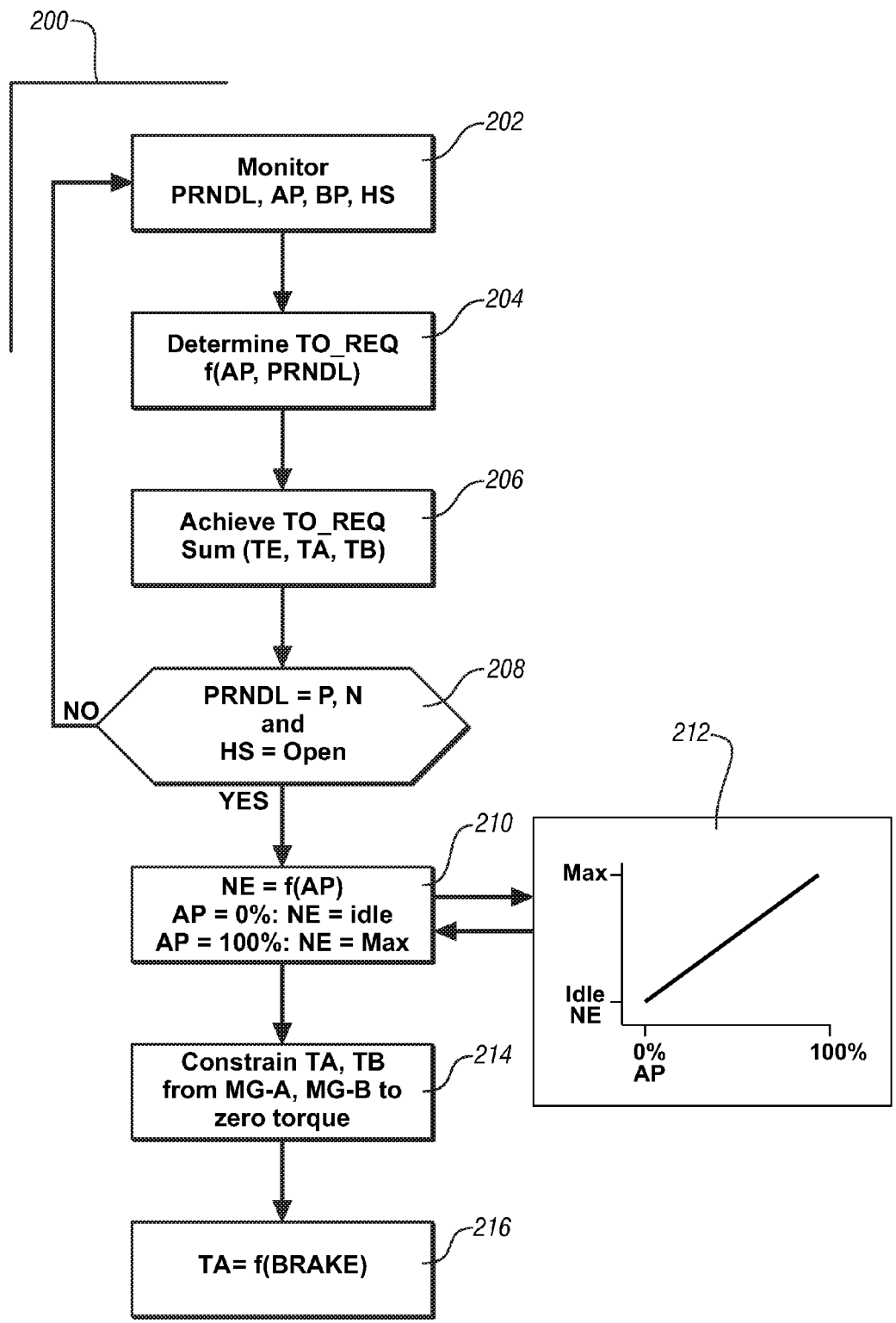
FIG. 2 is a schematic diagram of an algorithmic flowchart.

FIG. 2 depicts a flowchart 200 for monitoring and controlling operation of the vehicle 100 and the powertrain system, which is executed as machine code, preferably in the HCP 5. When the flowchart 200 is completely executed, the HCP 5 effects operating the engine 14 specifically responsive to the operator input through the user interface 13, independently of the first and second electric machines 56 and 72 and the transmission 10. The user interface 13 regularly monitors inputs from the hood switch 112, the accelerator pedal 113, the transmission gear selector 114, and, the brake pedal 115, preferably during one of the loop cycles described above (202). During ongoing operation, the HCP 5 determines the operator torque request based upon the operator input to the user interface 13, comprising position of the accelerator pedal 113 and the position of the transmission gear selector 114 (204). The HCP 5 controls oversees operation of the engine 14 and the first and second electric machines 56 and 72 to generate and transmit the torque output via the transmission 10 to the output shaft to achieve the operator torque request, as described above (206). This operation is ongoing during operation of the vehicle 100.

When the transmission gear selector 114 is in either the PARK position or the NEUTRAL position the HCP 5 controls the operation to optimize torque and achieve predetermined goals related to fuel efficiency and overall energy management. Thus, powertrain operation can include the HCP 5 commanding the ECM 23 to shut off the engine 14 or operate the engine 14 in a cylinder deactivation mode to conserve fuel. Powertrain operation can include the HCP 5 commanding the TCM 17 to selectively actuating one or more of the clutches to transmit torque from the engine 14 to one of the first and second electric machines 56 and 72 to generate electric power to increase the state-of-charge of the ESD 74 and to support accessory loading from the vehicle 100.

When there is an input indicating an intent to service the vehicle 100, the HCP 5 changes operation. The input indicating an intent to service the vehicle 100 comprises the input signal from the hood switch 112 indicating that the hood 102 is opened, and the input from the transmission gear selector 114 indicating an operator request for one of the PARK position and the NEUTRAL position (208). Subsequently and in response thereto, a control scheme in the HCP 5 adapts operation of the powertrain control system to modify operation of the powertrain. The HCP 5 adapts operation of the powertrain to control engine output linearly correlative to the operator input to the accelerator pedal 113. This operation comprises inducing a change in the engine output speed based upon operator input to the accelerator pedal 113. When there is no operator input to the accelerator pedal 113, e.g., no depression of the accelerator pedal 113 by the operator, the accelerator pedal 113 signal output is readable as 0%, and the engine operates at an idle condition. Similarly, when the operator input to the accelerator pedal 113 consists of the accelerator pedal 113 fully depressed by the operator, the signal output is readable as 100%, and the engine operates at a maximum engine speed (210). The engine speed ranges linearly between the idle speed and the maximum engine speed as the operator input to the accelerator pedal 113 varies from no operator depression to full depression. In the embodiment described, the HCP 5 commands the ECM 23 to induce change in the engine speed by controlling opening position of the electronically controlled throttle device 15 to control the intake airflow. Thus, when the output of the accelerator pedal 113 is 0%, the electronically controlled throttle device 15 is controlled to a substantially closed position, yet open sufficiently to operate the engine at idle speed. When the output of the accelerator pedal 113 is 100%, the electronically controlled throttle device 15 is controlled to a substantially wide-open position, permitting and causing the rotational speed of the engine 14 to increase and approach maximum speed, with the engine speed limited by operating characteristics of the engine (212).

The system operation further comprises operation to control torque outputs, TA and TB respectively, from the first and second electric machines 56 and 72 when the hood switch 112 is open and the transmission gear selector 114 is in one of the PARK and the NEUTRAL position (214). Torque outputs from the first and second electric machines 56 and 72 are controlled by controlling electric loading and electric power flow in the system between ESD 74 and either of the first and second electric machines 56 and 72. This is accomplished by controlling torque outputs from both the first and second electric machines 56 and 72, i.e., TA and TB, to zero torque, including controlling torque output from both the first and second electric machines 56 and 72 to a net-zero torque by applying a positive torque to one of the electric machines and an equivalent magnitude of negative torque to the other of the electric machines. A preferred method to accomplish the zero torque output in the exemplary embodiment is to constrain a change in the state-of-charge of the ESD 74, by limiting electric loading, e.g., limiting operation of electrically-powered accessories, and limiting increases in the state-of-charge of the ESD 74 by limiting the electrical current flow. Constraining changes in the state-of-charge of the ESD can also be accomplished by constraining the minimum and maximum battery powers, $P_{BAT\_MIN}$, $P_{BAT\_MAX}$, to predetermined levels that are less than the calibrated minimum and maximum battery power occurring when the hood 102 is closed (214).

System operation to control torque output from the first and second electric machines 56 and 72 can include controlling electric power flow to a predetermined electric load, which is applied to the engine to induce a torque load thereon. For example, the input shaft 12 from the engine 14 can be operatively connected to the first electric machine 56 such that power output from the engine is directly transmitted to the first electric machine 56 and decoupled from the driveline when the electro-mechanical transmission 10 operates in a gear/mode operating state comprising an input-split operating state. Thus torque generated in the first electric machine 56, i.e., TA, is applied to the engine based upon the operator input to the brake pedal 115 (216).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Control system for a vehicular powertrain system including an engine and an electro-mechanical transmission and an electric machine arranged in an input-split hybrid configuration and selectively operatively controllable to transmit torque therebetween and to a driveline, the control system comprising:

a control module signally connected to a plurality of input devices and configured to execute program code stored on a computer readable medium to control the powertrain, the program code comprising:
code to monitor operator inputs;
code to determine an intent to service the vehicle based upon the operator inputs;
code to command the electric machine to generate a net torque output of zero; and
code to control the engine speed correlative to an operator depression of an accelerator pedal;
wherein the operator inputs comprise a hood switch and a transmission gear selector, wherein intent to service is determined by the hood switch indicating a open vehicle hood and the transmission gear selector indicating one of a PARK position and a NEUTRAL position; and
wherein the operator inputs further comprise an accelerator pedal, further comprising code to control the engine speed ranging substantially linearly from an idle speed correlated to the accelerator pedal indicating 0% depression to a maximum engine speed correlated to the accelerator pedal indicating 100% depression.

2. The control system of claim 1, wherein the code to control the engine speed comprises code to control intake air flow based upon the accelerator pedal position.

3. The control system of claim 2, wherein the operator inputs further comprise a brake pedal, further comprising code to decouple the electric machine from the driveline and to control the electric machine to induce a torque load on the engine based upon brake pedal depression.

\* \* \* \* \*